United States Patent [19]

Iijima et al.

[11] Patent Number: 4,546,848
[45] Date of Patent: Oct. 15, 1985

[54] DIFFERENTIAL GEAR HOUSING SUPPORTING APPARATUS

[75] Inventors: Yoshitaka Iijima, Atsugi; Takaaki Uno, Zama; Mitsuru Watanabe, Inuyama, all of Japan

[73] Assignee: Nissan Motor Company, Limited, Japan

[21] Appl. No.: 551,461

[22] Filed: Nov. 14, 1983

[51] Int. Cl.[4] .............................................. B62D 25/00
[52] U.S. Cl. .................................. 180/312; 248/560; 267/54 C
[58] Field of Search .............. 180/312, 292, 299, 902; 267/54 A, 54 B, 54 C, 136, 140.5, 141; 248/637, 560

[56] References Cited

U.S. PATENT DOCUMENTS 4,203,499  5/1980  Miyata ................................ 180/312
4,405,027  9/1983  Enokimoto et al. ................. 180/312

FOREIGN PATENT DOCUMENTS 778426  7/1957  United Kingdom .
1078553  8/1967  United Kingdom .
1118853  7/1968  United Kingdom .
1371248  10/1974  United Kingdom .
1487340  9/1977  United Kingdom .

Primary Examiner—Richard A. Bertsch
Attorney, Agent, or Firm—Leydig, Voit & Mayer

[57] ABSTRACT

A differential gear housing is connected to the vehicle body through at least one first elastic member which deforms in shear mode when the housing vibrates up or down or back and forth to the vehicle body and additionally through at least one second elastic member which deforms in both shear and compression modes when the housing vibrates up and down and in only shear mode when the housing vibrates back and forth. Since the deformation mode of the second elastic member changes from shear mode to compression mode gradually with increasing displacement of the member, it is possible to obtain a desirable elastic modulus such that the elastic members are soft when vibrations are small but hard when vibrations are strong, without any points of discontinuity.

8 Claims, 7 Drawing Figures

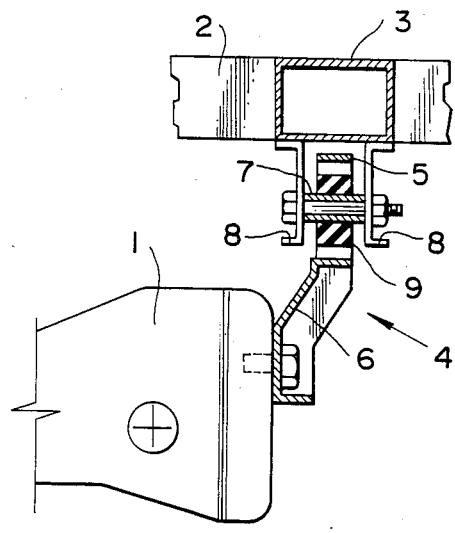
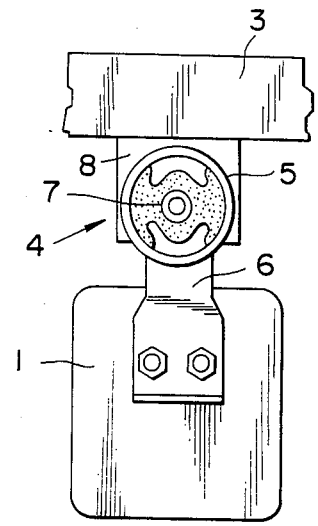
FIG.1 (PRIOR ART)
FIG.2 (PRIOR ART)
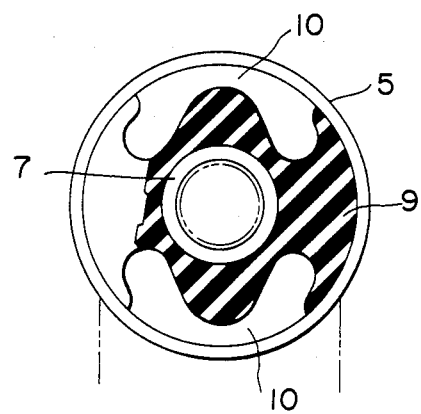
FIG.3 (PRIOR ART)

DIFFERENTIAL GEAR HOUSING SUPPORTING APPARATUS

BACKGROUND OF THE INVENTION

1. Field of the Invention

The present invention relates generally to a differential gear housing supporting apparatus for a vehicle and more specifically to a differential gear housing supporting apparatus for a vehicle of rear-wheel independent suspension type.

2. Description of the Prior Art

In an automotive vehicle of rear-wheel independent suspension type, it is necessary to elastically supporting the differential gear housing from the vehicle body. In the prior-art differential gear housing supporting apparatus, a rubber elastic member of peculiar shape is disposed between an inner cylindrical bracket fixed to the vehicle body and an outer cylindrical bracket fixed to the differential gear housing. The elastic modulus (ratio of stress increment to strain increment) of the elastic member of this type is as follows when the vehicle body vibrates up and down: in the case where the displacement of the rubber elastic member is relatively small and therefore the elastic member is not in contact with the outer cylindrical bracket, since the elastic member deforms in shear mode, the elastic modulus is relatively small (elastic member is soft); however, in the case where the displacement of the rubber elastic member is relatively great and therefore the elastic member is brought into contact with the outer cylindrical bracket, since the elastic member deforms in compression mode, the elastic modulus is relatively great (elastic member is hard). Therefore, the elastic modulus changes abruptly at a point of discontinuity. This causes a problem in that when the vehicle is quickly accelerated or decelerated and thereby the differential gear housing vibrates violently in relation to the vehicle body up and down, the rubber elastic member is repeatedly brought into contact with outer cylindrical bracket, thus making loud knock sounds. Additionally, the elastic modulus of such prior-art apparatus is not preferable. This is because the elasticity should be soft when the differential gear housing vibrates up and down slightly to the vehicle body, but be strong enough to restrict the displacement of the differential gear housing securely below a predetermined upper limit when the differential gear housing vibrates up and down violently, without any points of discontinuity. In other words, it is preferable that the vertical displacement of the elastic member increases sharply at high gradient with increasing load when vibration is not great but gently at a low gradient with increasing load to a restricted displacement limit when vibration is great, smoothly and gradually without any discontinuity.

A more detail description of an example of prior-art differential gear housing supporting apparatus will be made with reference to attached drawings under Detailed Description of the Preferred Embodiments.

SUMMARY OF THE INVENTION

With these problems in mind, therefore, it is the primary object of the present invention to provide a differential gear housing supporting apparatus for an automotive vehicle such that when the differential gear housing vibrates up and down relative to the vehicle body, the displacement of the elastic member increases gradually and smoothly to an upper limit with increasing load applied thereto, without any points of discondinuity, having relatively small elastic modulus (soft elasticity) in the range where the vibration is small but relatively great elastic modulus (hard elasticity) in the range where the vibration is great.

To achieve the above-mention object, the elastic member according to the present invention is so designed as to deform both in shear and compression modes when the differential gear housing vibrates up and down. In more detail, the elastic member deforms mainly in shear mode in the range where the load applied to the elastic member is relatively small but mainly in compression mode in the range where the load is relatively great, the deformation mode thereof being changed from shear mode to compression mode gradually with increasing displacement thereof without any discontinuity.

In reality, the differential gear housing supporting apparatus according to the present invention comprises a first bracket fixed to the vehicle body, a second bracket fixed to the differential gear housing, a first elastic member disposed between the first and second brackets so as to deform in shear mode when the differential gear housing vibrates up and down and back and forth, and a second elastic member also disposed between the first and second brackets so as to deform in both shear and compression modes when the differential gear housing vibrates up and down and in only shear mode when the housing vibrates back and forth. Additionally, an auxiliary elastic member is also disposed between the first and second brackets so as to deform in compressin mode when the differential gear housing vibrates right and left. To allow the second elastic member to deform in both shear and compression modes when the housing vibrates up and down, in the embodiment described later, a pair of the second elastic members are symmetrically disposed obliquely with respect to the vertical plane longitudinally bisecting the vehicle body.

BRIEF DESCRIPTION OF THE DRAWINGS

The features and advantages of the differential gear housing supporting apparatus according to the present invention over the prior-art apparatus will be more clearly appreciated from the following description of the preferred embodiment of the invention taken in conjunction with the accompanying drawings in which like reference numerals designate the same or similar elements or sections throughout the figure thereof and in which:

FIG. 1 is a cross-sectional side view showing an example of prior art differential gear housing supporting apparatus for an automotive vehicle disposed between a vehicle body chassis and a differential gear housing;

FIG. 2 is a back view showing the prior-art differential gear housing supporting apparatus shown in FIG. 1;

FIG. 3 is an enlarged cross-sectional, partially cut-away, front view of the elastic member used with the prior-art differential gear housing supporting apparatus shown in FIGS. 1 and 2;

DETAILED DESCRIPTION OF THE PREFERRED EMBODIMENTS

Figure 4:
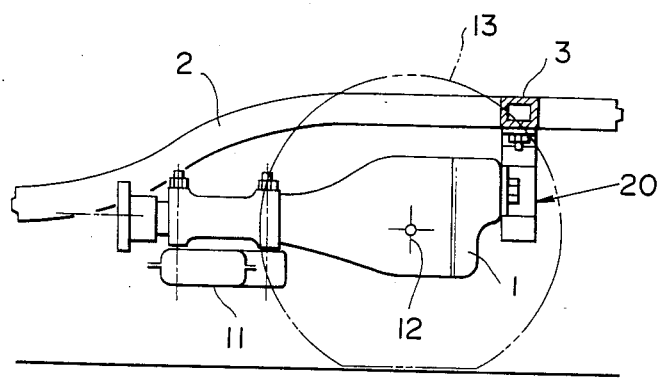
FIG. 4 is a side, partially cross-sectional view showing an embodiment of the differential gear housing supporting apparatus according to the present invention disposed between a vehicle body chassis and a differential gear housing.

To facilitate understanding of the present invention, a brief reference will be made to a prior-art differential gear housing supporting apparatus for an automotive vehicle of rear-wheel independent suspension type, with reference to the attached drawings.

FIGS. 1, 2 and 3 show an example of prior-art differential gear housing supporting apparatus. In the figures, the reference numeral 1 denotes a differential gear housing; the numeral 2 denotes two side chassis members of the vehicle body; and the numeral 3 denotes a differential cross-member fixed across the two side chassis members 2. The prior-art differential gear housing supporting apparatus 4 includes an outer cylindrical bracket 5 fixed to the differential gear housing 1 by the aid of an outer bracket fixing member 6, an inner cylindrical bracket 7 fixed to the differential cross member 3 by the aid of a pair of inner bracket fixing members 8 and a vulcanized rubber elastic member 9 bonded to the inner and outer cylindrical brackets 7 and 8. Further, a pair of clearances 10 are symmetrically provided between the outer cylindrical bracket 5 and the rubber elastic member 9, as depicted in FIG. 3.

In the prior-art differential gear housing suspension apparatus shown in FIGS. 1, 2 and 3, the elastic modulus (ratio of stress increment to strain increment) in the vertical direction is such that: in the case where the displacement of the vulcanized rubber elastic member 9 is relatively small and therefore the elastic member 9 is not in contact with the outer cylindrical bracket 5, since the elastic member 9 deforms in shear mode, the elastic modulus is relatively small (elastic member is soft); and in the case where the displacement of the rubber elastic member 9 is relatively great and therefore the elastic member 9 is in contact with the outer cylindrical bracket 5, since the elastic member 9 deforms mainly in compression mode, the elastic modulus is relatively great (elastic member is soft). In more detail, when the differential gear housing vibrates up and down slightly to the vehicle body, the elastic member deforms relatively sharply with increasing load applied to the member with a high gradient; however, when the differential gear housing vibrates up and down violently to the vehicle body, the elastic member deforms relatively gently with increasing load applied to the member with a low gradient, having a point of discontinuity. Therefore, there exists a problem in that when the vehicle is quickly accelerated or decelerated and thereby the differential gear housing vibrates violently in the vertical direction of the vehicle body, the rubber elastic member 9 is repeatedly brought into contact with the outer cylindrical bracket 5, thus making loud knock sounds.

Additionally, since the elastic modulus changes abruptly at a point of discontinuity, the elasticity is not desirable for the differential gear housing supporting apparatus. The desirable elasticity is such that the elastic member is soft when the differential gear housing vibrates up and down slightly but strong enough to restrict the displacement of the differential gear housing securely below a predetermined upper limit when the housing vibrates up and down violently, without any points of discontinuity.

In view of the above description, reference is now made to the embodiment of the differential gear housing supporting apparatus according to the present invention.

Figure 5:
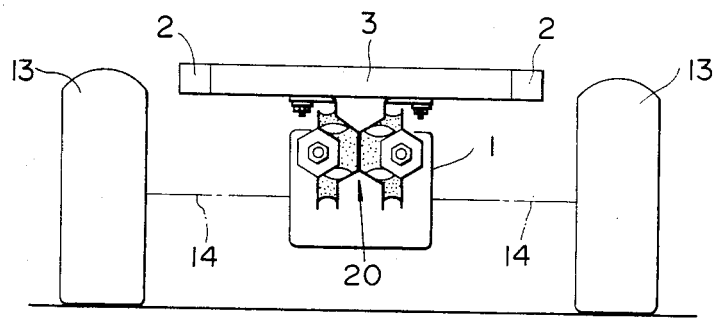
FIG. 5 is a back view showing the differential gear housing supporting apparatus according to the present invention shown in FIG. 4.
Figure 6:
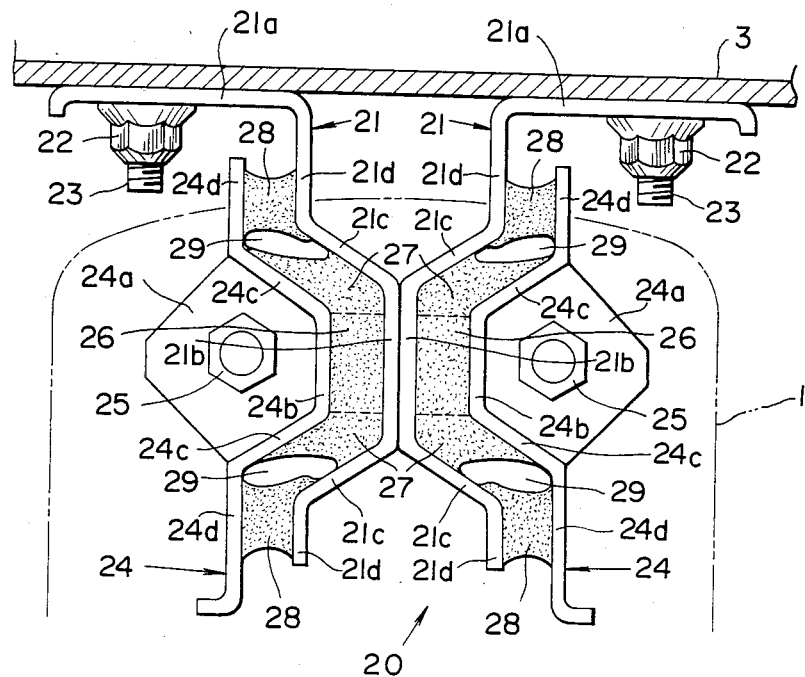
FIG. 6 is an enlarged back view of the differential gear housing supporting apparatus according to the present invention.

FIGS. 4 to 6 shows an embodiment of the present invention applied to an automotive vehicle provided with a rear-wheel independent suspension system. In FIG. 4, a differential gear housing 1 is supported by the supporting apparatus 20 according to the present invention to a differential cross member 3 fixed across two vehicle side chassis members 2. In this drawing, the reference numeral 11 denotes a rear suspension member; the numeral 12 denotes a wheel center; and the numeral 13 denotes rear wheels. In FIG. 5, the reference numeral 14 denotes a driving shaft center.

With reference to FIG. 6, the differential gear housing supporting apparatus 20 is roughly made up of a first bracket 21 fixed to the differential cross member 3 with nuts 22 and bolts 23, a pair of second brackets 24 fixed to the back end surface of the differential gear housing 1 with other bolts 25, a pair of first elastic members 26, two pairs of second elastic members 27 and a pair of auxiliary elastic members 28, these elastic members being all made of vulcanized rubber and bonded between the first and second brackets.

The first bracket 21 is made of a long and narrow metal plate by cutting it at an appropriate length and bending it at appropriate angles into each bracket strip having a perpendicular flange 21a and a hemi-hexagonal recess near its center. Thereafter, the two bracket strips are symmetrically welded in roughly X-shape with each hemi-hexagonal recess arranged concave outward. The two perpendicular flanges 21a are fixed to the differential cross member 3 with the nuts and bolts 23.

Each of the second bracket 24 is made of a long and narrow metal plate by cutting it at an appropriate length and bending it at appropriate angles into a shape having a smaller hemi-hexagonal recess so formed as to be arranged along the greater hemi-hexagonal recess of the first bracket 21 with a constant space therebetween and a mounting pad 24a perpendicularly extending from one end portion of the strip near its center. Each of the mounting pad 24a is fixed to the rear end surface of the differential gear housing 1 with the bolt 25.

Each first elastic member 26 is disposed and bonded between the vertical portion 21b of the large hemi-hexagonal recess of the first bracket 21 and the vertical portion 24b of the small hemi-hexagonal recess of the second bracket 24. Therefore, the first elastic member 26 deforms in shear mode when the differential gear housing 1 moves up and down (vertically) or back and forth (longitudinally) but deforms in compression mode only when the differential gear housing 1 moves right and left (laterally). The two first elastic members 26 are disposed symmetrically with respect to the vertical plane longitudinally bisecting the vehicle body.

Each second elastic member 27 is disposed and bonded between an oblique portion 21c of the large hemi-hexagonal recess of the first bracket 21 and an oblique portion 24c of the small hemi-hexagonal recess of the second bracket 24, separately from or integrally with the first elastic member 26. Therefore, the second elastic member 27 deforms both in shear and compression modes when the differential gear housing 1 moves up and down (vertically) and right and left (laterally) but deforms only in shear mode when the housing 1 moves back and forth (longitudinally). The two pairs of the second elastic members 27 are disposed symmetrically with respect to the vertical plane longitudinally bisecting the vehicle body or the horizontal plane longitudinally extending in parallel with the differential cross member 3.

Each auxiliary elastic member 28 is disposed and bonded between the upper or lower vertical portion 21d of the first bracket 21 and the upper or lower vertical portion 24d of the second bracket 24. Therefore, the auxiliary elastic member 28 deforms in shear mode when the differential gear housing 1 moves up and down (vertically) or back and forth (longitudinally) but deforms in compression mode only when the differential gear housing 1 moves right and left (laterally).

The two pairs of the auxiliary elastic members 28 are also disposed symmetrically with respect to the vertical plane longitudinally bisecting the vehicle body or the horizontal plane longitudinally extending in parallel with the differential cross member 3.

The auxiliary elastic members 28 serve to increase the durability against the vertical vibrations of the differential gear housing 1 and to increase the elastic modulus against the lateral vibration of the housing 1. Further, hollow portions 29 are formed between the end of the second elastic members 27 and the end of the auxiliary elastic members 28 to decrease the elastic modulus against the vertical vibration of the housing 1.

The elastic characteristics of the differential gear housing supporting apparatus according to the present invention will be described hereinbelow being classified by up-and-down (vertical) vibrations, back-and-forth (longitudinal) vibrations and right-and-left (lateral) vibrations.

(1) Up-and-down vibrations:

In the case where a vertical load is applied to the differential gear housing supporting apparatus 1 from the differential cross member 3 or the differential gear housing 1 and therefore the apparatus 1 deforms up and down slightly, the first elastic member 26 deforms in shear mode; the second elastic member 27 deforms mainly in shear mode; the auxiliary elastic member 28 deforms only in shear mode. Therefore, the synthesized elastic modulus is relatively small (soft) and therefore the displacement of the apparatus sharply increases with increasing the vertical load. However, when the vertical load increases and therefore the displacement of the apparatus also increases, the second elastic member 27 begins to deform mainly in compression mode gradually, thus the elastic modulus becoming greater and greater (harder and harder) with the increasing deformation of the apparatus 1. The heavier the load, the harder the elastic members and therefore the smaller the displacement, thus the displacement being restricted within a predetermined limit.

Figure 7:
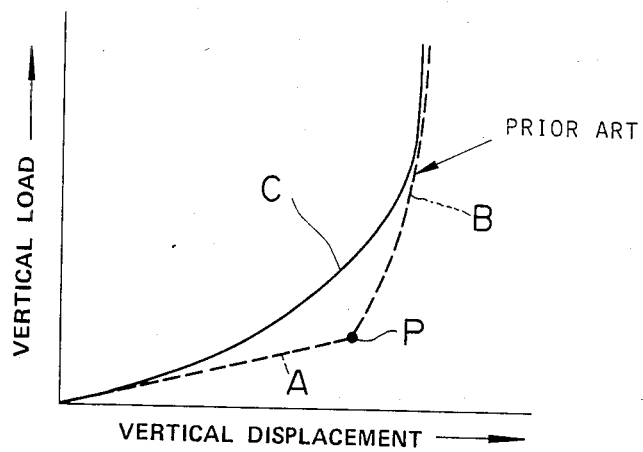
FIG. 7 is a graphical representation showing the relationship between elastic member vertical displacement and load applied to the elastic member, in which that of the prior-art apparatus is shown by dashed lines and that of the present invention is shown by a solid line.

To describe in more detail with reference to FIG. 7, in the prior-art supporting apparatus 4 shown in FIG. 3, although the elastic modulus is such that the vertical displacement increases sharply with increasing vertical load as shown by label A, if the vertical displacement exceeds a predetermined point P, that is, when the elastic member 9 is brought into contact with the outer cylindrical bracket 5, the displacement increases gently with increasing vertical load abruptly as shown by label B. In other words, there exists a point of discontinuity as shown by label P.

On the other hand, in the supporting apparatus 20 according to the present invention, since the second elastic members 27 deform mainly in shear mode in the range where the vertical displacement is small but deform mainly in compression mode in the range where the vertical displacement is great without any points of discontinuity, the synthesized elastic modulus changes from small to great (soft to hard) gradually and smoothly with increasing vertical load. In other words, the vertical displacement of the supporting apparatus 4 increases sharply at high gradient with increasing load when the vibration is small but gently at low gradient with increasing load to a predetermined restricted displacement limit when the vibration is great, as shown by label C in FIG. 7.

(2) Back-and-forth vibrations:

In the case where a longitudinal load is applied to the differential gear housing supporting apparatus 1 from the differential cross member 3 or the differential gear housing 1 and therefore the apparatus 1 deforms back and forth, the first elastic members 26, the second elastic members 27 and the auxiliary elastic members 28 all deform only in shear mode. Accordingly, the synthesized elastic modulus is small and therefore the displacement of the apparatus sharply increases with increasing longitudinal load. These soft elastic members are preferable for preventing the back-and-forth vibrations of the vehicle.

(3) Right-and-left vibrations:

In the case where a lateral load is applied to the differential gear housing supporting apparatus 1 from the differential cross member 3 or the differential gear housing 1 and therefore the apparatus 1 deforms right and left, the first elastic members 26 deform in compression mode; the second elastic members 27 deforms partially in compression mode; the auxiliary elastic members 28 deforms in compression mode. Accordingly, the synthesized elastic modulus is great and therefore the displacement of the apparatus gently increases with increasing lateral load. These hard elastic members are preferable for preventing the right-and-left vibration of the vehicle.

An embodiment of the differential gear housing supporting apparatus according to the present invention has been described by way of example, with reference to FIGS. 4, 5, and 6. However, without being limited to the embodiment shown in FIGS. 4, 5, and 6, it is of course possible to embody the features of the present invention by use of the first and second brackets formed in various shapes and the first and second elastic members formed in variious shapes and arranged in various positions, provided that some of elastic members are disposed so as to deform in both shear and compression modes when the differential gear housing vibrates up and down, in the same manner as described hereinabove.

As described above, in the differential gear housing supporting apparatus according to the present invention, since the differential gear housing is connected to the vehicle body though at least one first elastic member which deforms in shear mode when the differential gear housing vibrates up and down or back and forth and additionally at least one second elastic member which deforms in both shear and compression modes when the housing vibrates up and down and in only shear mode when the housing vibrates back and forth, it is possible to obtain synthesized elastic modulus preferable to a differential gear housing supporting apparatus, which are soft when the vibrations are small but hard when the vibrations are strong, without having any points of discontinuity, the deformation mode of the elastic member being changed from shear mode to compression mode gradually with increasing displacement thereof.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A differential gear housing supporting apparatus for elastically supporting a differential gear housing on a vehicle body, which comprises:
   (a) a first bracket fixed to the vehicle body;
   (b) a second bracket fixed to the differential gear housing;
   said first and second brackets being arranged vertically and having concave outward and convex inward portions with a substantially constant space therebetween;
   (c) at least one first elastic member disposed between said first and second brackets within a substantially vertical portion of the space, said first elastic member deforming in shear mode when the differential gear housing vibrates up and down or back and forth relative to the vehicle body; and
   (d) a pair of second elastic members disposed between said first and second brackets respectively above and below a first member in an inclined portion of the space, said second elastic members deforming in both shear and compression modes during both up and down portions of vibrations when the differential gear housing vibrates up and down and in only shear mode when the differential gear housing vibrates back and forth, the deformation mode of said second elastic member changing gradually from shear mode to compression mode with increasing displacement thereof.

2. A differential gear housing supporting apparatus as set forth in claim 1 which further comprises at least one auxiliary elastic member disposed between said first and second brackets, said auxiliary elastic member deforming in shear mode when the differential gear housing vibrates up and down or back and forth but in compression mode when the differential gear housing vibrates right and left.

3. A differential gear housing supporting apparatus as set forth in claim 1 wherein said first bracket is made up of two mirror-symmetrically bent strips, one of which has a perpendicular flange fixed to the vehicle body and a hemi-hexagonal recess near its center, said two bent strips being fixedly arranged concave outward so that their inward-most surfaces meet along a vertical plane longitudinally bisecting the vehicle body.

4. A differential gear housing supporting apparatus as set forth in claim 3 wherein said second bracket is made of two separate mirror-symmetrically bent strips, one of which has a perpendicular mounting pad fixed to the differential gear housing and a hemi-hexagonal recess near its center, said two separate second brackets being arranged also concave outward and convex inward within the two hemi-hexagonal recesses of said first bracket member with a constant space therebetween.

5. A differential gear housing supporting apparatus as set forth in claim 4 wherein said first elastic member is made up of two separate members, each of which is disposed between the vertical portion of the hemi-hexagonal recess of said first bracket and the vertical portion of the hemi-hexagonal recess of said second bracket, respectively in symmetry with a vertical plane longitudinally bisecting the vehicle body.

6. A differential gear housing supporting apparatus as set forth in claim 5 wherein said second elastic members are each made up of four separate members, each of which is disposed between the oblique portion of the hemi-hexagonal recess of said first bracket and the oblique portion of the hemi-hexagonal recess of said second bracket, separately from or integrally with said first elastic member on both the end surfaces of said first elastic member, in symmetry with respect to the vertical plane longitudinally bisecting the vehicle body.

7. A differential gear housing supporting apparatus for elastically supporting a differential gear housing to a vehicle body, which comprises:
   (a) a first bracket fixed to the vehicle body;
   (b) a second bracket fixed to the differential gear housing;
   (c) at least one first roughly-cubic elastic member disposed vertically between said first and second brackets; and
   (d) at least one roughly-rhombic second elastic member disposed between said first and second brackets with the two sides of said roughly-rhombic elastic member arranged horizontally and with the other two sides thereof arranged obliquely with respect to the vehicle body.

8. A differential gear housing supporting apparatus for elastically supporting a differential gear housing to a vehicle body, which comprises:
   (a) a first bracket fixed to the vehicle body;
   (b) a second bracket fixed to the differential gear housing;
   (c) at least one first elastic member disposed vertically with respect to the vehicle body between said first and second brackets in such a way as to deform in shear mode when the differential gear housing vibrates up and down or back and forth to the vehicle body; and
   (d) at least one second elastic member (27) disposed obliquely with respect to the vehicle body between said first and second brackets in such a way as to deform in both shear and compression mode when the differential gear housing vibrates up and down and in only shear mode when the differential gear housing vibrates back and forth, the deformtion mode of said second elastic member changing gradually from shear mode to compression mode with increasing displacement thereof.

* * * * *

UNITED STATES PATENT AND TRADEMARK OFFICE
CERTIFICATE OF CORRECTION

PATENT NO. : 4,546,848

DATED : October 15, 1985

INVENTOR(S) : IIJIMA ET AL

It is certified that error appears in the above-identified patent and that said Letters Patent is hereby corrected as shown below:

Title page:

[73] Assignee: Nissan Motor Company, Limited, and
Tokai Rubber Industries, Limited
both of Japan Signed and Sealed this Twentieth Day of May 1986

[SEAL]

Attest:

DONALD J. QUIGG

Attesting Officer

Commissioner of Patents and Trademarks